Sept. 1, 1970  I. H. NICHOLS  3,526,049

RETAINER PIN FOR EARTH ENGAGING MEMBER

Original Filed June 20, 1967

INVENTOR
IRVIN H. NICHOLS

BY

*Gauntlett & Carr*

ATTORNEYS

United States Patent Office 3,526,049
Patented Sept. 1, 1970

3,526,049
RETAINER PIN FOR EARTH ENGAGING MEMBER
Irvin H. Nichols, Auburn, Calif. (4040 Badillo Circle, Apt. 87, Baldwin Park, Calif. 91706)
Continuation of application Ser. No. 647,458, June 20, 1967. This application June 17, 1969, Ser. No. 835,300
Int. Cl. E02f 9/28
U.S. Cl. 37—142                     2 Claims

ABSTRACT OF THE DISCLOSURE

A drive pin for fastening one member to another including a duality of elongated members having opposed faces interconnected with a layer of resilient compressible material, one of said members being provided with a localized outward bulge intermediate the ends thereof for entering a recess in an opening into which said device is driven for retaining said device in such an opening.

---

This application is a continuation of Ser. No. 647,458, filed June 20, 1967, now abandoned.

BACKGROUND OF THE INVENTION

The field of the invention

This invention relates to unthreaded fastening devices primarily for retaining removable parts on earthmoving equipment.

The prior art

In earthmoving and cutting equipment, the blade, bit, tooth or the like that engages the earth normally is furnished as a removable element. This is because these elements wear out during the use of the equipment and must be replaced at frequent intervals. Bolts have been used to hold the blades and the like on the supporting members, but this has meant that installation and removal have been laborious and time-consuming. Generally, it is not possible to loosen and remove the bolts after a period of service, so that they must be cut off before the blade can be removed. This has resulted in expensive delays and excessive downtime.

It has been proposed to use some form of drive pin to fit within openings in the blade and the support to act as the securing means in lieu of bolts. These have been compressible unthreaded members driven axially in place to speed up the blade-attaching operation. Conventional drive pins, however, usually are devised for use in the horizontal attitude relative to the machine with which they are associated. Vertical type pins have been tapered members driven from the top into correspondingly tapered openings. Upon removal, these elements must be driven outwardly from the bottom because of the taper of the pin and the opening. In many items of equipment, it is difficult or impossible to obtain access to the space beneath the drive pin for removal by driving it upwardly. Hence, such tapered drive pins can have only limited utility.

SUMMARY OF THE INVENTION

The present invention provides a simple and effective drive pin that can be placed in a vertical attitude and both installed and removed from the top. The drive pin includes a duality of elongated steel elements of generally semicylindrical configuration, having opposed flat radial faces. Intermediate these faces is a layer of rubber bonded to the outer members. The bottom ends of the outer members are tapered to facilitate their entry into an opening in the device being secured, but otherwise these members are straight longitudinally. One of the outer pin members includes a localized outward bulge at its midportion. This is adapted to enter a recess in the opening through one of the devices being secured when the pin has been driven fully into position. The protrusion cooperates with the recess to hold the pin in place. For removal, it is necessary only to drive downwardly on the top of the pin, effecting displacement of the bulged portion from its recess so that the pin is free to move downwardly and out through the bottom of the opening.

An object of this invention is to provide an improved, simplified drive pin for holding blades, bits, teeth or the like to supporting elements of earthmoving and cutting equipment.

Another object of this invention is to provide a drive pin fastener which can be both installed and removed by being driven from the same side of the item being secured.

A further object of this invention is to provide a drive pin which is positively retained and will not be dislodged during service.

A still further object of this invention is to provide a drive pin which has the effect of drawing the connected items closer together when the drive pin is installed.

These and other objects will become apparent from the following detailed description taken in connection with the accompanying drawing.

DESCRIPTION OF THE PREFERRED EMBODIMENT

Figure 1:
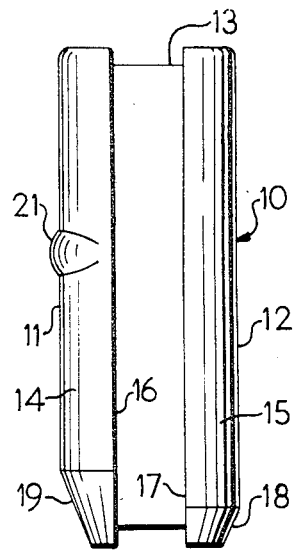
FIG. 1 is a side elevational view of the drive pin of this invention.
Figure 2:
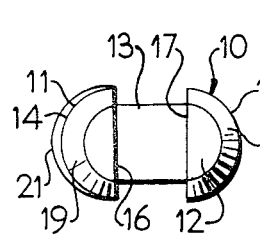
FIG. 2 is a bottom plan view of the drive pin.
Figure 3:
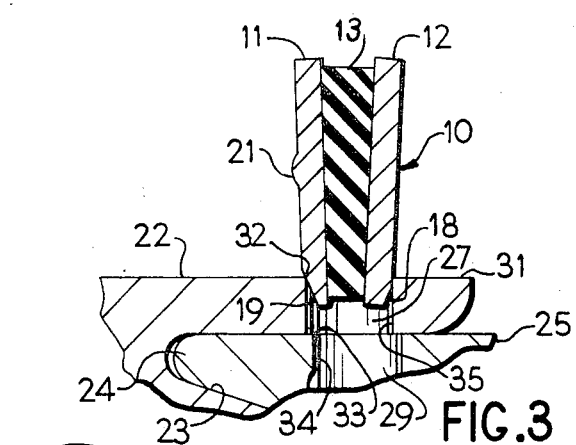
FIG. 3 is a sectional view illustrating the pin during an initial stage of insertion into position for holding a blade on a supporting member.
Figure 4:
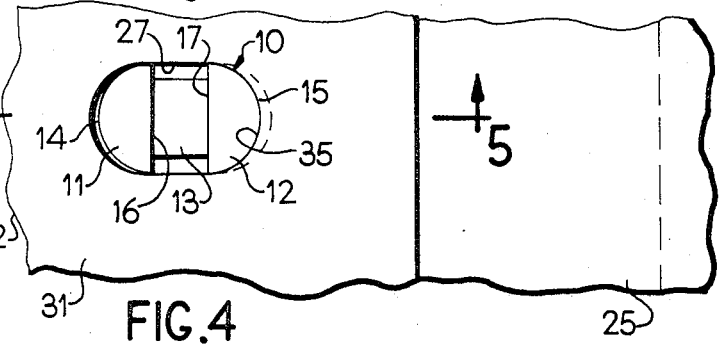
FIG. 4 is a fragmentary plan view of the drive pin as installed in the blade and support.

The drive pin 10 of this invention includes two outer elongated rigid members 11 and 12 and a central resilient core 13. The members 11 and 12 may be of steel and the core 13 of rubber. The members 11 and 12 are of generally semicylindrical configuration, having arcuate outer faces 14 and 15 and radial inner surfaces 16 and 17, respectively. The rubber core 13 is bonded to the surfaces 16 and 17 of the members 11 and 12, thereby holding the elements of the drive pin together as a unit.

The lower edge portion of the member 12 is provided with a tapered frustoconical surface 18. The lower edge portion 19 of the member 11 also is tapered and frustoconical, preferably at a shallower angle relative to the axis of the pin. The surfaces 14 and 15, however, are straight longitudinally without convergence.

Intermediate its ends the member 11 is provided with a localized outward bulge 21. This lateral protrusion is rounded so that it inclines inwardly from its midportion toward the two ends of the member 11.

The drive pin 10 of this invention typically is used in holding a removable blade to a supporting structure. A device of this type, which includes a plurality of pockets in the blade receiving projecting portions of the support, is illustrated in Pat. 3,160,967. The drive pin 10, however, is usable with other types of removable elements on earthmoving or other equipment.

In the arrangement illustrated, a blade 22 is provided with a wedge-shaped recess 23 tapering from its larger open end toward the opposite end of the receptacle. This receives a generally complementary projection 24 of a supporting member 25. The pin 10 is used in holding the blade 22 on the support 25. The blade 22 is provided with straight aligned openings 27 and 28 of equal lateral dimension extending transversely across the recess 23. These apertures are generally oval-shaped in cross section, with the opposite edge portions being substantially complementary to the surfaces 14 and 15 of the drive pin elements 11 and 12. A similar opening 29 is provided in the projection 24 of the supporting member 25. A lateral arcuate recess 30 is provided in the central portion of the opening 29 in the element 24.

When the blade 22 initially is placed on the support 25, it will fit far enough on the projection 24 to cause the openings 27 and 28 to overlap the opening 29 in the support projection 24. However, the openings 27 and 28 will be slightly outwardly of the opening 29 as the axes of these openings will be parallel but not aligned. This is because the parts are proportioned such that the blade, when manually pushed onto the support, will move inwardly only to a location where the openings have such relationship.

With the blade 22 positioned in this manner on the support 25, the pin 10 then is driven downwardy into the openings from the top surface 31 of the blade. The pin 10 is made slightly larger in width in its free position than the width of the opening 27. Consequently, the inner layer 13 of the pin becomes compressed slightly as it enters the opening 27. The tapered edges 18 and 19 facilitate movement of the pin into this opening without interference from the corner 32 of the opening at the surface 31.

As the pin continues to move downwardly, the tapered surface 19 strikes the upper corner 33 of the support at the opening 29. Because of the inclination at the surface 19, the pin readily moves on into the opening 29 without obstruction, becoming compressed additionally as this movement takes place. The protrusion 21 of the pin also strikes the corner 33 as the pin is moved into the openings. The fact that the protrusion 21 has an arcuate configuration tapering toward the ends of the pin means that it readily passes the corners at the edges of the openings without interfering with the movement of the pin.

Figure 5:
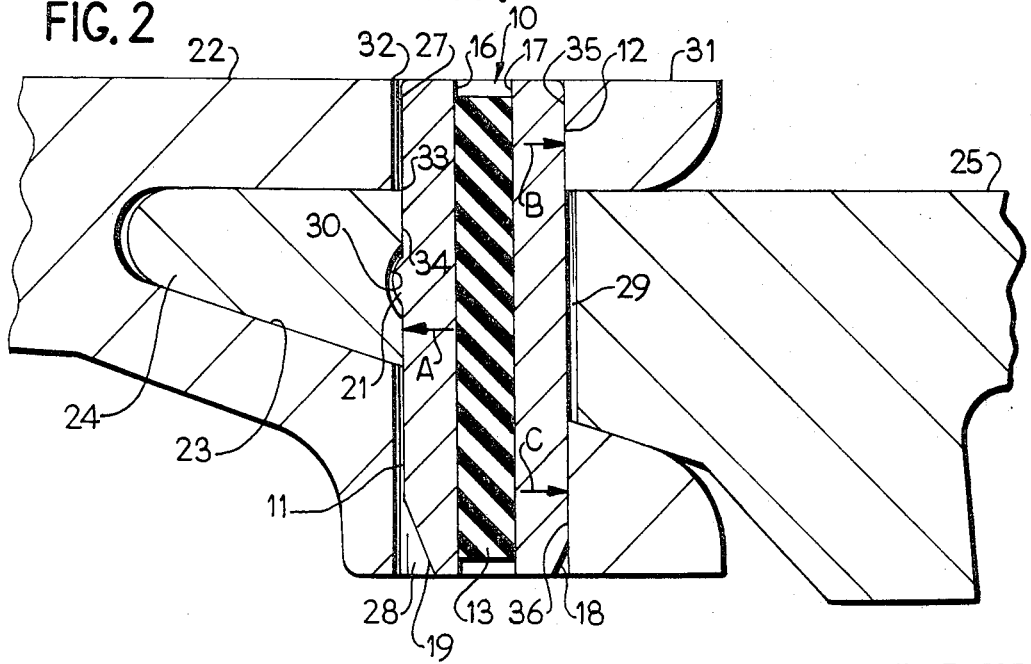
FIG. 5 is a fragmentary sectional view taken along line 5—5 of FIG. 4.

Ultimately, the pin 10 reaches the position of FIG. 5, where it is fully received within the opening 27, 28 and 29. When this occurs, the protrusion 21 of the pin member 11 moves outwardly into the recess 30 in the projecting portion 24 of the suport 25. The interengagement between the protuberance 21 and the wall of the recess 30 assures that the pin will remain in place during use of the equipment. With the pin 10 under compression, the protrusion 21 is held firmly in the recess 30, and vibrational and other loads on the pin will not cause it to become dislodged. Thus, the pin will stay in position throughout the life of the blade 22.

With the pin 10 installed in the manner shown in FIG. 5, it engages only the outward side 34 of the opening 29 as it is held away from the opposite wall of this opening by its engagement with the blade 22. Also, the pin contacts only the inner side 35 of the opening 27 and the inner wall 36 of the opening 28. By being compressed and bearing against only these lateral surfaces, the pin 10 acts to draw the blade 22 tighter onto the support. Thus, it exerts an outward force A on the wall 34 of the opening 29, which is balanced by inward forces B and C on the surfaces 35 and 36 that force the blade tightly onto the support. Therefore, the pin 10 not only holds the blade 22 to the support, but has the added function of drawing the blade farther onto the support and holding it securely in such position in firm engagement with the projection 24, where it is fully supported during the use of the equipment.

When the blade 22 has worn out and is to be removed, its disassembly is accomplished quite easily by driving out the pin 10 from the top of the blade unit. It is necessary only to strike the top end of the pin 10 to drive it downwardly through the bottom opening 28 in the blade 22. The blows will cause the arcuate protuberance 21 to leave the recess 30, permitting the pin 10 to be forced all the way out of the assembly at the bottom as the axially straight walls 14 and 15 of the pin slide along the walls of the openings. Thus, removal of the blade is accomplished without difficulty, despite the fact that there may be no access to the area beneath the blade at the opening 28. When the pin has been removed, the blade simply is pulled off the support projection 24, which then is ready to accept a replacement item. The pin 10 may be used over and over in securing successive blades to the support 25.

The foregoing detailed description is to be clearly understood as given by way of illustration and example only, the spirit and scope of this invention being limited solely by the appended claims.

I claim:

1. In combination with an earth-engaging member and a support member therefor, the first of said members having a substantially wedge-shaped receptacle therein tapering from a larger outer end toward the inner end thereof, the second of said members having a wedge-shaped projecting portion substantially complementarily received in said receptacle, said wedge-shaped projection having outwardly convergent opposite surfaces, said first member having axially aligned straight openings extending transversely of said receptacle, said second member having a straight opening through said projecting portion, each of said openings being of substantially constant and equal lateral dimension, said opening through said projecting portion overlapping said openings of said first member with their axes substantially parallel, said opening in said projecting portion of said second member extending between said opposite surfaces, a device for holding said members together comprising a duality of rigid elongated longitudinally straight elements,
said elements being positioned in said openings,
said elements having opposed parallel adjacent faces, said elements having semicylindrical outer surfaces remote from each other,
the axes of said outer surfaces being parallel,
and a layer of resilient material bonded to and intermediate said faces,
each of said elongated elements having an inwardly tapered edge at the one end of said outer surface thereof,
the taper for said inwardly tapered edge of one of said elongated elements being substantially longer than the taper for said inwardly tapered edge of the other of said elongated elements,
said one elongated element having a localized outward bulge on the outer surface thereof intermediate the ends thereof and spaced from said tapered edge thereof,
said other elongated element having no outward bulge on the outer surface thereof intermediate the ends thereof,
said second member in the wall of said opening therethrough having a recess intermediate and spaced from said opposite surfaces thereof,
said recess receiving said bulge for holding said one elongated element longitudinally therein,
the outer surface of said one elongated element engaging one side of said wall of said opening through said second member, and being spaced from the walls of said openings in said first member, the outer sursurface of said other elongated element engaging the opposite side of the wall of each of said openings through said first member while being spaced from the wall of said opening in said second member, said resilient layer being under compression, whereby said holding device urges said projecting portion into said receptacle, said outward bulge being tapered toward said one end, whereby said device can be driven from said openings by striking the upper ends of said members so as to dislodge said bulge from said recess and cause slight additional compresison of said resilient layer.

2. A device as recited in claim 1 in which said tapered edges are defined by sections of frustums of cones, said tapered edge of said one elongated element being tapered more shallowly and having a substantially greater length than said tapered edge of said other elongated element.

References Cited

UNITED STATES PATENTS

| | | |
|---|---|---|
| 2,435,847 | 2/1948 | Robertson. |
| 2,568,075 | 9/1951 | Launder. |
| 2,702,490 | 2/1955 | Launder. |
| 2,837,844 | 6/1958 | Launder. |
| 2,949,687 | 8/1960 | Peklay et al. |
| 3,020,655 | 2/1962 | Launder. |

EDGAR S. BURR, Primary Examiner

U.S. Cl. X.R.

175—413